(12) United States Patent
Toni et al.

(10) Patent No.: US 10,840,803 B2
(45) Date of Patent: Nov. 17, 2020

(54) DC-DC CONVERTER WITH CURRENT SENSING AND CONTROL

(71) Applicant: Chaoyang Semiconductor Jiangyin Technology Co., Ltd, Jiangyin (CN)

(72) Inventors: Arnaud Toni, San Diego, CA (US); Mykhaylo Teplechuk, San Diego, CA (US)

(73) Assignee: Chaoyang Semiconductor Jiangyian Technology Co., Ltd., Jiangyin (CN)

( * ) Notice: Subject to any disclaimer, the term of this patent is extended or adjusted under 35 U.S.C. 154(b) by 0 days.

(21) Appl. No.: 16/546,111

(22) Filed: Aug. 20, 2019

(65) Prior Publication Data

US 2020/0059158 A1 Feb. 20, 2020

Related U.S. Application Data

(60) Provisional application No. 62/719,856, filed on Aug. 20, 2018.

(51) Int. Cl.
*H02M 3/07* (2006.01)
*G05F 1/575* (2006.01)

(52) U.S. Cl.
CPC .............. *H02M 3/07* (2013.01); *G05F 1/575* (2013.01)

(58) Field of Classification Search
CPC ............ H02M 3/00; H02M 3/02; H02M 3/04; H02M 3/06; H02M 3/07
USPC ........................................................ 327/536
See application file for complete search history.

(56) References Cited

U.S. PATENT DOCUMENTS

| 5,381,328 A | 1/1995 | Umezawa et al. |
| 2013/0119954 A1* | 5/2013 | Lo .............................. G05F 1/10 323/280 |
| 2016/0143098 A1 | 5/2016 | Nishitani |
| 2017/0133927 A1 | 5/2017 | Almukhtar et al. |

FOREIGN PATENT DOCUMENTS

| CN | 102468752 A | 5/2012 |
| JP | 2010-158167 A | 7/2010 |

OTHER PUBLICATIONS

International Search Report on related PCT Application No. PCT/US2019/047322 from International Searching Authority (KIPO) dated Dec. 5, 2019.
Written Opinion on related PCT Application No. PCT/US2019/047322 from International Searching Authority (KIPO) dated Dec. 5, 2019.

* cited by examiner

*Primary Examiner* — John W Poos
(74) *Attorney, Agent, or Firm* — Klein, O'Neill & Singh, LLP

(57) ABSTRACT

A voltage regulator utilizes a non-invasive sensing capacitor in differentially sensing a current indicative of current of an output capacitor of the voltage regulator. Some embodiments utilize current mirrors and an inverter for determining if the current indicative of current of the output capacitor is above or below a particular magnitude. Some embodiments utilize information indicative of output capacitor current in determining duty cycle for a switching voltage regulator, and some embodiments utilize the information in activating transient control circuitry.

17 Claims, 9 Drawing Sheets

DC-DC CONVERTER WITH CURRENT SENSING AND CONTROL

CROSS REFERENCE TO RELATED APPLICATION

This application claims the benefit of the filing date of U.S. Provisional Patent Application No. 62/719,856, filed on Aug. 20, 2018, the disclosure of which is incorporated by reference herein.

BACKGROUND OF THE INVENTION

The present invention relates generally to regulated DC-DC voltage converters, and more particularly to capacitor current control for a DC-DC voltage converter.

Regulated DC-DC voltage converters generally provide for regulated power to operational circuitry, for example integrated circuits in semiconductor devices used in a wide variety of applications. Integrated circuits generally require provision of power within particular parameters during operation. The provision of such power may face many complexities. For example, semiconductor chips including the integrated circuits may have different portions that require power at the same or different times, different portions may require power within different parameters, and some portions may utilize different amounts of power at different times. Complicating matters, some devices may be powered by batteries having relatively small capacities, while the devices themselves, at least at various times, may require large amounts of power.

Provision of large amounts of power to integrated circuits may be potentially damaging to the devices. For this reason, and others, regulated voltage converters may attempt to determine current provided by or to an output capacitor of the voltage converter.

In addition, in many cases power requirements of the operational circuitry may vary greatly, and vary greatly within short time frames. Properly controlling converter operation in the face of sudden changes in desired output power may be difficult to accomplish.

BRIEF SUMMARY OF THE INVENTION

Aspects of some embodiments may provide for sensing of an indication of current of an output capacitor of a voltage regulator, using at least one differential current comparator block. In some embodiments the differential current comparator block comprises at least one sensing capacitor coupled to an output node for the output capacitor, at least one current mirror coupled to the sensing capacitor, at least one ground sensing capacitor coupled to a ground node of the output capacitor, at least one further current mirror coupled to the ground sensing capacitor, and at least one current comparator for determining an indication of difference between current of the sensing capacitor and current of the ground sensing capacitor. In some embodiments the at least one current comparator comprises an inverter. Aspects of some embodiments may provide for use of a plurality of differential current comparator blocks, each of the plurality of differential current comparator blocks sharing use of the at least one further current mirror coupled to the output capacitor. Aspects of some such embodiments provide different offsets for at least some of the plurality of differential comparator blocks.

Aspects of some embodiments may provide for sensing of an indication of current of an output capacitor of a switching DC-DC voltage regulator, using a plurality of differential current comparator blocks, at least some of which are configured so as to utilize different offsets whereby different current levels of the output capacitor may be determined. Aspects of some embodiments are configured to utilize indications of different current levels of the output capacitor to adjust a duty cycle of the voltage regulator. Aspects of some embodiments are configured to activate transient control circuitry based on indications of at least some of the different current levels. In some embodiments, the active transient control circuitry includes a plurality of legs, each leg configured to provide current to an output line coupling the output capacitor and a load and/or pull current from the output line coupling the output capacitor and the load, and aspects of some embodiments determine legs to activate based on indications of at least some of the different current levels.

Aspects of some embodiments may provide for a method of determining current of an output capacitor of a voltage regulator, comprising: converting a first voltage across a first sensing capacitor, coupled to an output node of an output capacitor of the voltage regulator, to a first current; converting a voltage across a ground sensing capacitor, coupled to a ground node of the output capacitor of the voltage regulator, to a ground current; and comparing the first current minus the current to a first particular current.

Aspects of some embodiments may provide for circuitry for determining current of an output capacitor of a voltage regulator, comprising: at least one sensing capacitor coupled to an output node for an output capacitor of the voltage regulator; at least one current mirror coupled to the sensing capacitor; at least one ground sensing capacitor coupled to a ground node of the output capacitor; at least one further current mirror coupled to the ground sensing capacitor; and at least one current comparator for determining an indication of difference between current of the sensing capacitor and current of the ground sensing capacitor with respect to at least one offset current.

Aspects of some embodiments may provide for a method of using output capacitor current information in controlling a voltage regulator, comprising: comparing output capacitor current to a plurality of predetermined current levels, the predetermined current levels defining a plurality of different regions of current levels; operating switches of the voltage regulator based on at least one output voltage feedback signal, and without regard to output capacitor current, when the output capacitor current is in a first region, the first region including an output capacitor current equal to zero; adjusting duty cycles of operation of the switches by a first extent when the output capacitor current is in a second or third region, the second and third region each bounding the first region, on opposite sides; and adjusting duty cycles of operation of the switches by a second extent, the second extent having a magnitude greater than the first extent, when the output capacitor current is in a fourth or fifth region, the fourth region bounding the second region and the fifth region bounding the third region.

Aspects of some embodiments may provide for a method of controlling operation of transient response circuitry for a voltage regulator, comprising: determining that an absolute magnitude of output capacitor current exceeds a predetermined limit; and in response to determining that an absolute magnitude of output capacitor current exceeds a predetermined limit, activating transient control circuitry configured to either provide current to a line coupling the output capacitor to a load or drain current from the line coupling the output capacitor to the load.

These and other aspects of the invention are more fully comprehended upon review of this disclosure.

DETAILED DESCRIPTION

Figure 1:
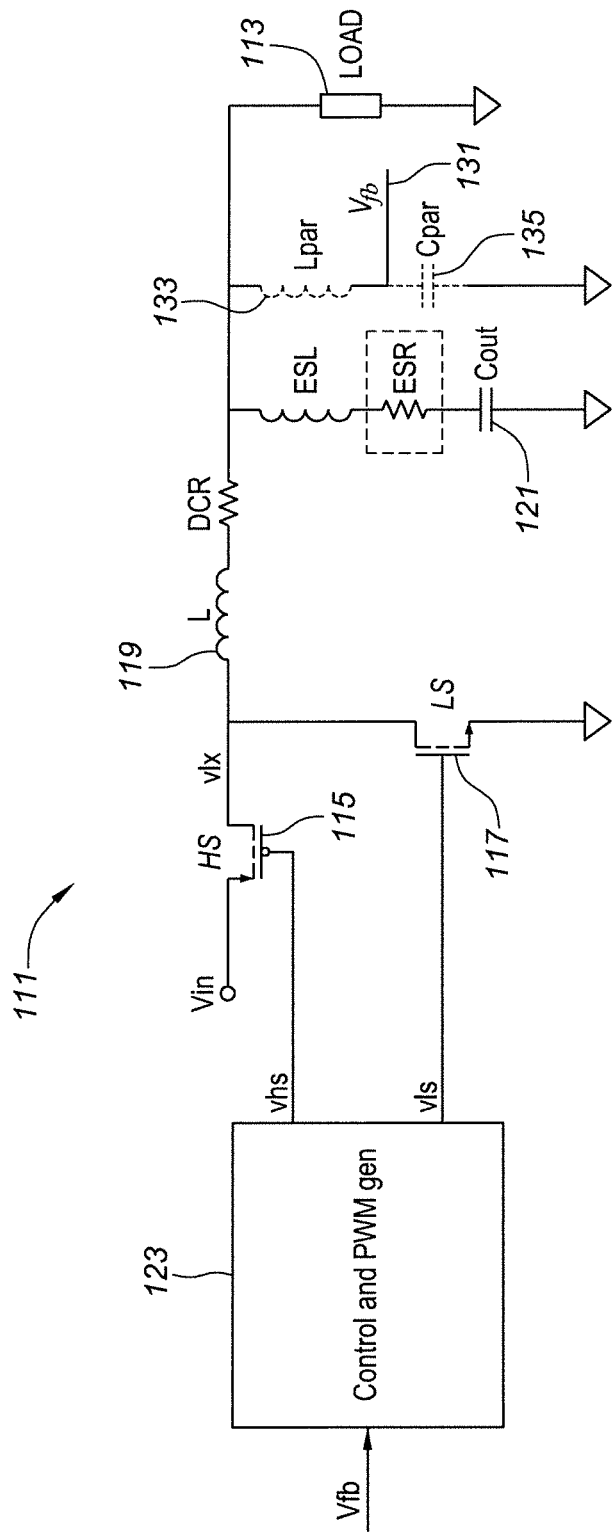
FIG. 1 is a semi-block diagram, semi-schematic of a switching voltage regulator and load.

FIG. 1 is a semi-block diagram, semi-schematic of a switching voltage regulator 111 and a load 113. As shown in FIG. 1, a pair of switches, a high side switch 115 and a low side switch 117, are coupled in series between an input voltage and a lower voltage. In many embodiments the input voltage is a supply voltage, for example provided by a battery, and in some embodiments the lower voltage is ground or some other lower voltage level, for example VSS with for example the input voltage being a higher voltage level considered VDD. A first end of an inductor 119 is coupled to a node between the high side switch and the low side switch. A second end of the inductor is coupled to an output capacitor 121 in parallel to the load. In addition, some embodiments may include a bypass switch (not shown) coupling the first end and the second end of the inductor.

A controller 123 controls operation of the high side switch and the low side switch (and the bypass switch if present). The controller controls the switches based on, for example, a voltage feedback signal indicating a voltage level of power provided to the load. In various embodiments the controller operates the switches using pulse width modulation (PWM) and/or pulse frequency modulation (PFM). In general, for a switching voltage regulator, either the high side switch is closed with the low side switch open, the low side switch is closed with the high side switch open, or both the high side switch and the low side switch are open, so as to maintain a regulated voltage to the load.

For FIG. 1, the voltage feedback signal is indicated as a Vfb signal, on a voltage feedback signal line 131. The voltage signal line is also shown as having a parasitic inductance 133 and a parasitic capacitance 135. Also for FIG. 1, an equivalent series inductance and an equivalent series resistance is shown for the output capacitor. The equivalent series resistance may be used in determining output capacitor current. There are difficulties in doing so, however; the equivalent series resistance may not be sufficiently large to develop a useful signal, for example considering noise issues, or, if sufficiently large may reduce power provided to the load to an unacceptable or undesirable degree.

Figure 2:
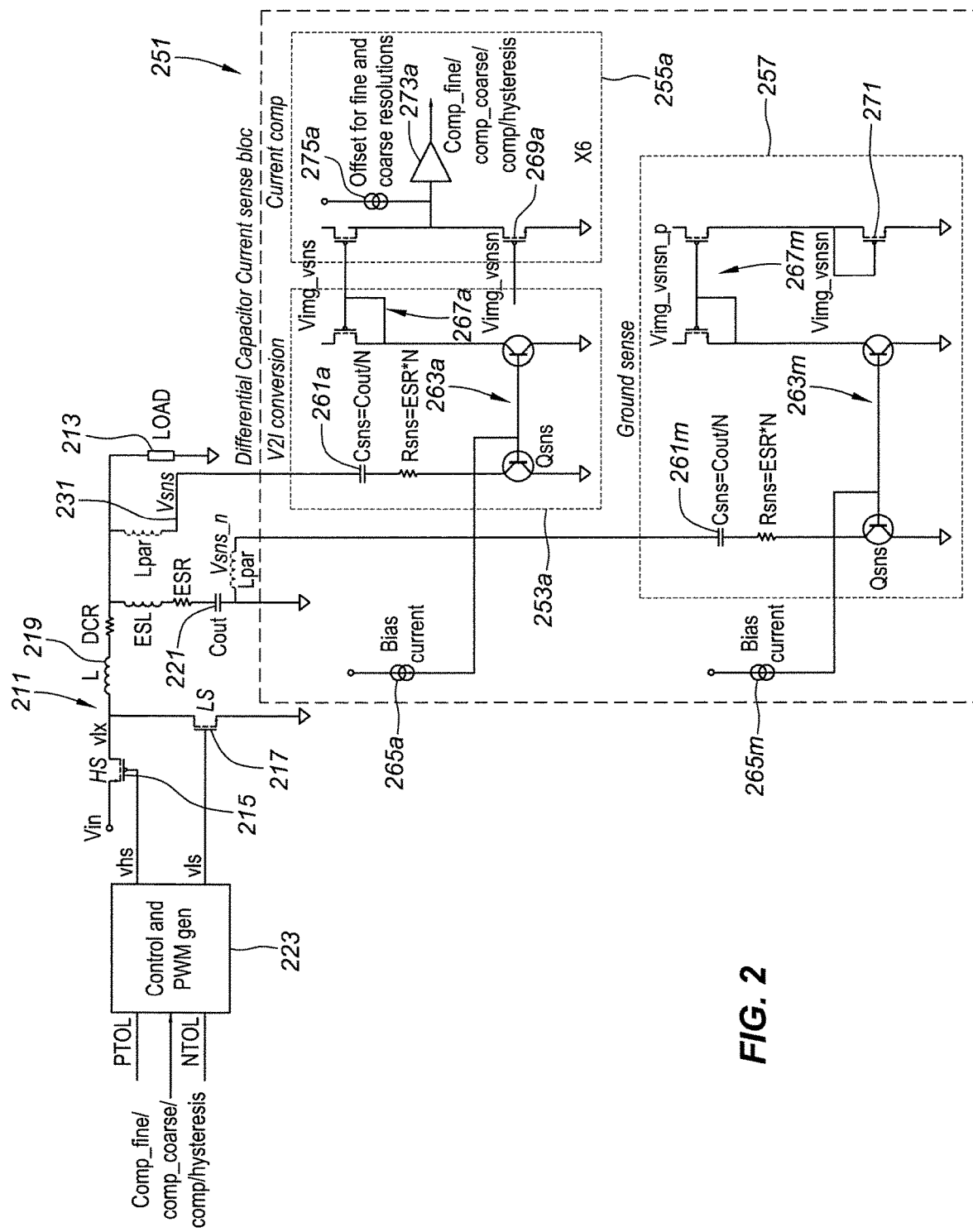
FIG. 2 is a semi-block diagram, semi-schematic including a switching voltage regulator with a differential capacitor current sense block in accordance with aspects of the invention.

FIG. 2 is a semi-block diagram, semi-schematic including a switching voltage regulator 211 with a differential capacitor current sense block 251 in accordance with aspects of the invention. Like the voltage regulator of FIG. 1, the voltage regulator of FIG. 2 has a high side switch 215 and a low side switch 217, are coupled in series between an input voltage and a lower voltage. A first end of an inductor 219 is coupled to a node between the high side switch and the low side switch. A second end of the inductor is coupled to an output capacitor 221 in parallel to a load 213. A controller 123 controls operation of the high side switch and the low side switch so as to provide a regulated voltage to the load. In doing so, the controller makes use of a PTOL signal, indicating that voltage to the load is above a desired voltage level plus a tolerance amount, and an NTOL signal, indicating that the voltage to the load is below the desired voltage minus a tolerance amount.

In controlling the high side switch and the low side switch, the controller also makes use of one or more signals indicative of output capacitor current. The signals indicative of output capacitor current may be provided by one or more differential capacitor current sense blocks 251.

For embodiments with a single differential capacitor current sense block, a pair of sensing capacitors may be used, with a first sensing capacitor coupled in parallel to the output capacitor and the load, and a ground sensing capacitor coupled in parallel to the output capacitor and ground (or Vss). In some embodiments the first sensing capacitor may be considered coupled to an output node of the output capacitor, namely a node between the output capacitor and the load. In some embodiments the ground sensing capacitor may be considered coupled to a ground node of the output capacitor, namely a node between the output capacitor and ground (or Vss). The first sensing capacitor may be considered part of output capacitor current sensing circuitry. The ground sensing capacitor may be considered part of ground sensing circuitry. Voltage of each of the first sensing capacitor and the ground sensing capacitor are converted to currents using voltage to current conversion circuitry. In some embodiments the current from the first sensing capacitor minus the current from the ground sensing capacitor is effectively compared to a first particular current using current comparison circuitry. In some embodiments a bipolar junction transistor current mirror is used in converting the voltages to currents. In some embodiments a secondary current mirror is coupled to the BJT current mirror used in converting the voltages to currents, and in some embodiments an inverter is used to effectively perform the comparison. An offset current source may also be coupled to the inverter, so as to provide for a comparison with a particular current level.

Embodiments with a plurality of differential capacitor current sense blocks may simply repeat the circuitry of the embodiment with a single differential capacitor current sense block, with for example different offsets used to allow for effectively performing comparisons with different current levels. In some embodiments, however, only one instance of circuitry for determining current associated the ground sensing capacitor, the ground sensing circuitry, may be provided and used commonly for all of the differential capacitor current sense blocks. Alternatively, and as illustrated in FIG. 2, a single differential capacitor current sense block may be used, with the block including multiple instantiations of the current comparison circuitry.

In the example embodiment of FIG. 2 circuitry for preforming a comparison for a single particular current level is explicitly shown. FIG. 2 also indicates that the output capacitor current sensing circuitry, or in some embodiments just the current comparison circuitry, would be instantiated 6 times (with different offsets) to provide for comparisons with a plurality of current levels.

The output capacitor current sensing circuitry illustrated in the example of FIG. 2 includes first voltage-to-current conversion circuitry 253a and first current comparison circuitry 255a. For some embodiments, with for example comparisons for six current levels, there may be six instantiations of the current comparison circuitry, with for example second current comparison circuitry 255b (not shown in FIG. 2), and so on up to sixth current comparison circuitry. Other embodiments, however, may instead include six instantiations of output capacitor current sensing circuitry, with second voltage-to-current conversion circuitry 253b (not shown in FIG. 2) and second current comparison circuitry 255b (not shown in FIG. 2), and so on, up to sixth voltage-to-current conversion circuitry and sixth current comparison circuitry for the embodiment of FIG. 2, and up to nth such circuitry in other embodiments, n being an integer.

The voltage-to-current conversion circuitry includes a sense capacitor 261a coupled to a node between the output capacitor (and parallel inductor 219) and the load. A resistor is in series with the sense capacitor. Preferably capacitance of the sense capacitor and resistance of the resistor have a product RC equal to a product of capacitance of the output capacitor and of resistance of the equivalent series resistance of the output capacitor. In some embodiments the resistor has a resistance N times the resistance of the equivalent series resistance of the output capacitor, and the sense capacitor has a capacitance 1/N times the capacitance of the output capacitor.

The sense capacitor and resistor provide an input leg into a current mirror 263a. Preferably the current mirror 263a is formed using bipolar junction transistors (BJTs), which may act as clamps and presenting an AC ground to the sensing capacitor. A bias current source 265a may also be used to provide a bias current to the current mirror 263a.

A mirrored leg of the current mirror 263a is coupled to and provides an input leg to a current mirror 267a. The current mirror 267a may be a Wilson current mirror in some embodiments. A mirrored leg of the current mirror 267a may be considered part of the first current comparison circuitry, along with a first sink transistor 269a, first offset current source 275a, and first current comparator 273a. The mirrored leg is coupled to ground (or Vss) by the first sink transistor 269a. Magnitude of current flowing through the sink transistor is based on a voltage determined by ground sense circuitry 257, for example as discussed below. A first current comparator 273a is coupled to the mirrored leg, at a node between the current mirror 267a and the first sink transistor 269a. In some embodiments the current comparator is a form of an inverter. The first offset current source is also coupled to the node between the current mirror 267a and the first sink transistor. As illustrated in FIG. 2, the first offset current source is shown as providing current to the node, in various embodiments, for at least some of the instantiations of the current comparison circuitry, the offset current source may instead sink current received by the node.

As with the output capacitor current sensing circuitry, the ground sense circuitry 257 also includes a sense capacitor 261m and resistor in series. The sense capacitor 261m is coupled to a node between the output capacitor and ground (or Vss). As with the first voltage-to-current conversion circuitry, preferably capacitance of the sense capacitor and resistance of the resistor have a product RC equal to a product of capacitance of the output capacitor and of resistance of the equivalent series resistance of the output capacitor. In some embodiments the resistor has a resistance N times the resistance of the equivalent series resistance of the output capacitor, and the sense capacitor has a capacitance 1/N times the capacitance of the output capacitor. In many embodiments, the product RC of the ground sense circuitry is the same as the product RC for the voltage-to-current conversion circuitry.

Also as with the output capacitor current sensing circuitry, the sense capacitor and resistor of the ground sense circuitry provide an input leg into a current mirror 263m. Preferably the current mirror 263m is formed using bipolar junction transistors (BJTs), which may act as clamps and presenting an AC ground to the sensing capacitor. A bias current source 265m may also be used to provide a bias current to the current mirror 263m.

A mirrored leg of the current mirror 263m provides an input leg to a current mirror 267m. In turn, a mirrored leg of the current mirror 267 provides a signal line coupled to a drain and gate of a transistor 271, which has its source coupled to ground (or Vss). In addition, the signal line is coupled to the gate of the sink transistor 269a (and similar transistors for other instantiations of the output capacitor current sensing circuitry), as discussed above.

Figure 3:
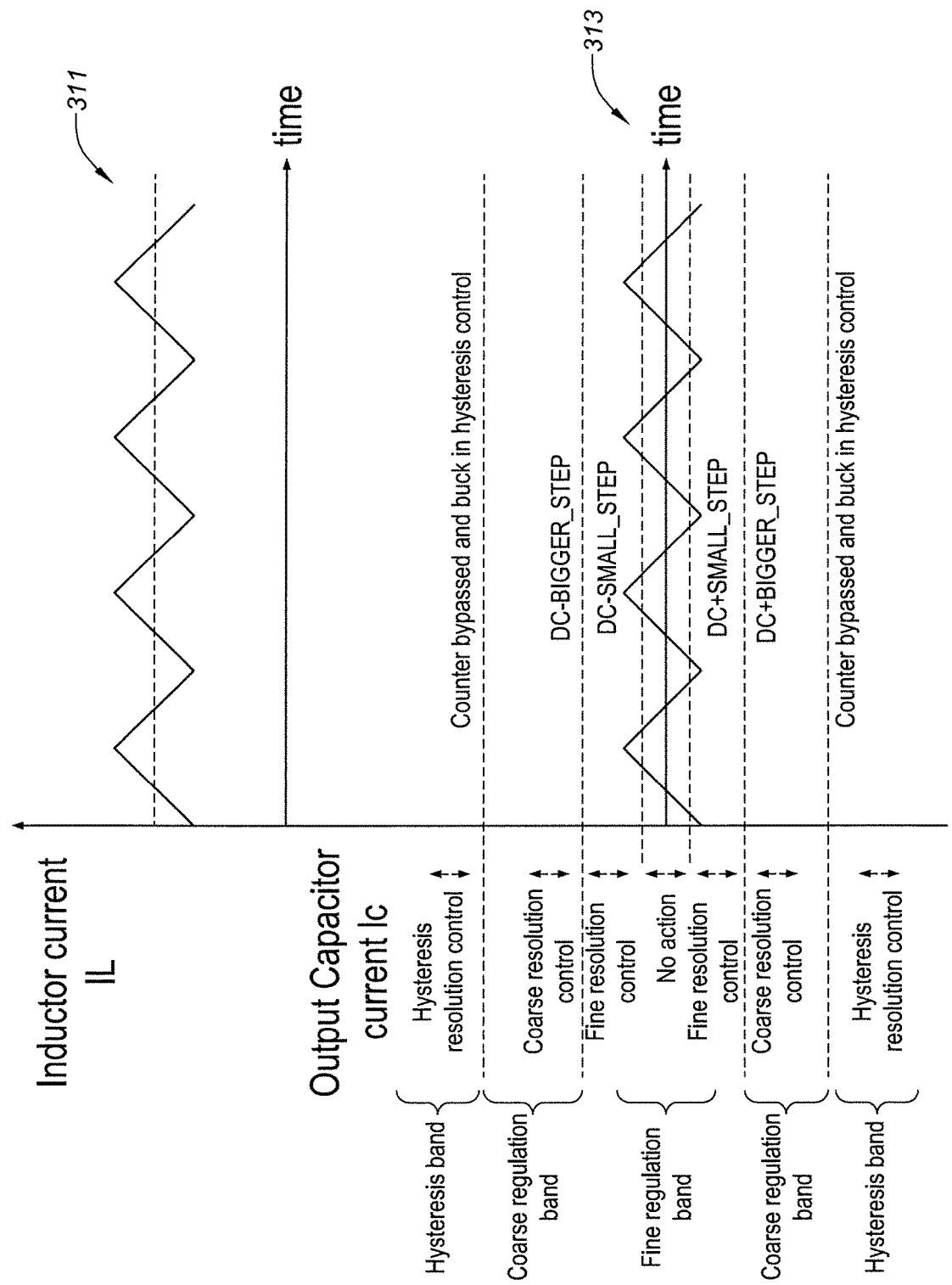
FIG. 3 provides graphs of inductor current over time and output capacitor current over time for a voltage regulator, showing regulation bands for different output capacitor current levels.

FIG. 3 provides graphs of inductor current over time and output capacitor current over time for a voltage regulator, showing regulation bands for different output capacitor current levels. The voltage regulator may be, for example, the voltage regulator of FIG. 2. A first graph 311 shows an example of inductor current over time. A second graph 313 shows an example of output capacitor current over the same time period.

The second graph also shows six current comparison levels. The six current comparison levels may be, for example, current comparison levels provided by the six instantiations of the output capacitor current sensing circuitry of the embodiment of FIG. 2. The six levels define seven regions of current levels. In some embodiments, and as illustrated in FIG. 3, the seven regions may include a central region indicating that output capacitor current is zero or near zero, three regions for output capacitor current indicating increasingly positive deviations from zero current of output capacitor current, and three regions indicating increasingly negative deviations from zero current of output capacitor current.

Monitoring of output capacitor current with respect to these regions may be used in operation of the voltage regulator. For example, in some embodiments it may be desirable for output capacitor current to be zero or close to zero, generally. In such embodiments, and as illustrated in FIG. 3, no action may be taken, to adjust control of the voltage regulator, if output capacitor current is within the central region. If output capacitor current is in the next higher region or next lower region, which may be considered as fine control regions, operation of the switches of the voltage regulator may be slightly adjusted, for example to slightly increase or decrease, respectively, a duty cycle of the switches. If output capacitor current is in a yet higher or lower region, regions for which output capacitor current exhibits greater deviations from zero current and which may be considered coarse control regions, operation of the switches of the voltage regulator may be adjusted to a greater extent, for example to increase or decrease the duty cycle of the switches to a greater extent. If output capacitor current is in yet a still higher or lower region, in what may be considered a hysteresis control band (with absolute magnitude of output capacitor current exceeding a predetermined limit), other actions may be taken. For example, in some embodiments capacitor output current in the hysteresis control band may be taken to indicate that a transient step in load requirements has occurred, and that the voltage regulator should activate transient control circuitry to provide additional current to the load, for excessively positive output capacitor current, or sink current from the load, for excessively negative output capacitor current.

Figure 4:
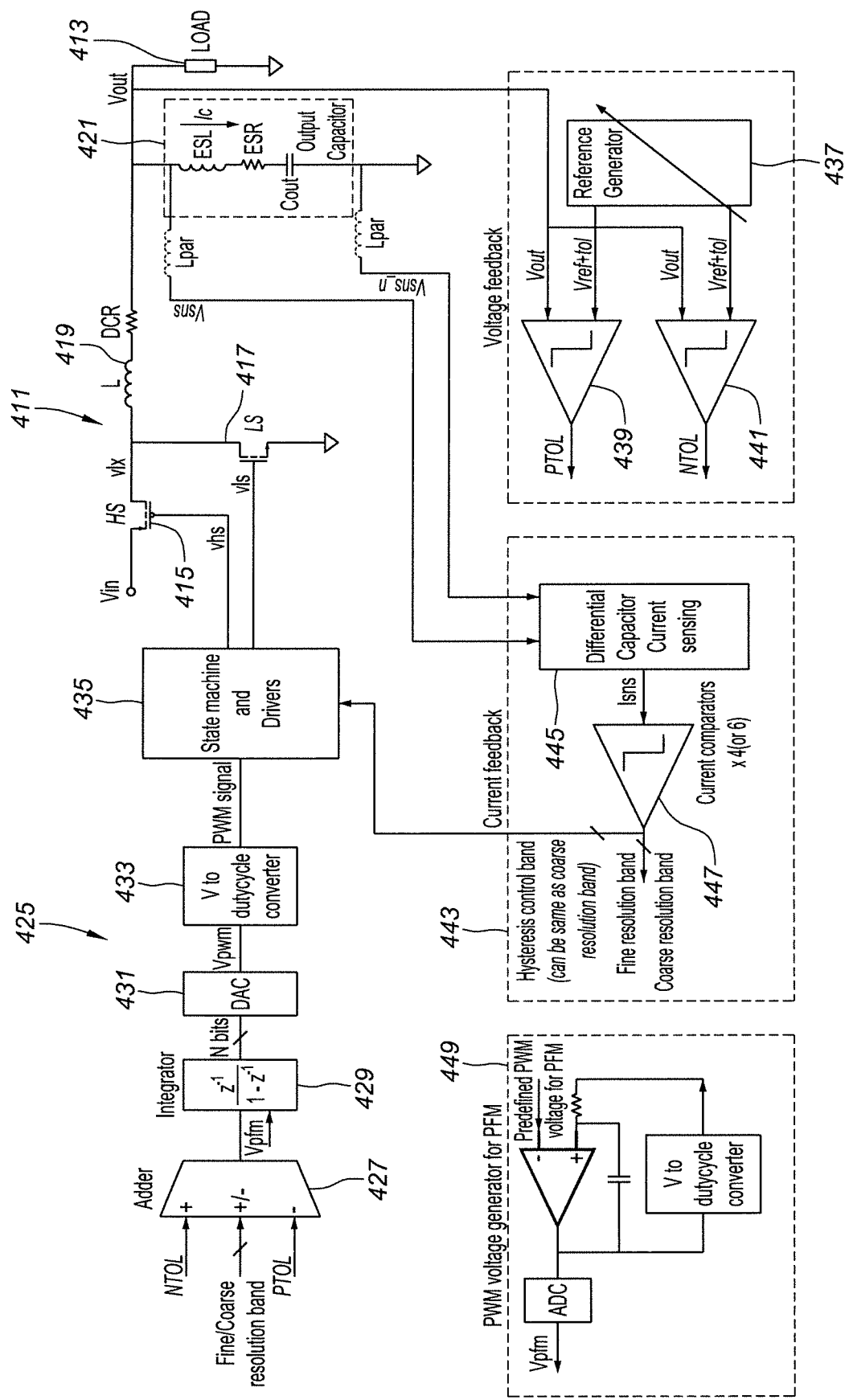
FIG. 4 is a semi-block diagram, semi-schematic including a switching voltage regulator with a differential capacitor current sensing in accordance with aspects of the invention.

FIG. 4 is a semi-block diagram, semi-schematic including a switching voltage regulator with a differential capacitor current sensing in accordance with aspects of the invention. The voltage regulator of FIG. 4 includes power transfer circuitry 411 with a high side switch 415 and a low side switch 417 coupled in series between an input voltage and a lower voltage. A first end of an inductor 419 is coupled to a node between the high side switch and the low side switch. A second end of the inductor is coupled to an output capacitor 421 in parallel to a load 413.

The voltage regulator of FIG. 4 includes control circuitry 425 for controlling operation of the high side and low side switches. The control circuitry controls the high side and low side switches based on both output voltage feedback signals and output capacitor current feedback signals.

For the voltage feedback signals, a reference generator 437 generates reference voltage plus tolerance voltage signal and a reference voltage minus tolerance voltage signal. The reference voltage may be, for example, a desired operating voltage for the load, as determined by a dynamic voltage and frequency scaling (DVFS) circuit (not shown), with the tolerance voltages allowing for slight deviations from the reference voltage. A high comparator 439 determines if voltage supplied to the load is greater than the reference voltage plus the tolerance voltage, and if so sets a PTOL signal high. A low comparator 441 determines if voltage supplied to the load is less than the reference voltage minus the tolerance voltage, and if so set an NTOL signal high. The PTOL signal and the NTOL signal are used to increment and decrement, respectively, a counter of the control circuitry used in controlling operation of the high side and low side switches.

The voltage regulator of FIG. 4 also determines an indication of output capacitor current using a current feedback block 443, and also uses that determination for control of operation of the high side and low side switches. In some embodiments the voltage regulator uses the output capacitor current sensing circuitry as discussed, variously, with respect to FIG. 2. In FIG. 4, the current feedback block receives a first signal on a first signal line from a node between the output capacitor and the load, and receives a second signal on a second signal line from a node between the output capacitor and ground (or Vss). In some embodiments the first signal line and the second signal line may be considered differential signal lines. In FIG. 4, the sensing capacitor provides the first signal and the second signal to a differential capacitor current sensing block 445 of the current feedback block. For some embodiments of FIG. 4, the differential capacitor current sensing block includes the sensing capacitor and resistor, the ground sensing capacitor and resistor, the current mirrors, current sources, and sink transistors as discussed with respect to FIG. 2. In some embodiments the sensing capacitor and resistor (and ground sensing capacitor and resistor) have a resistance and capacitance whose product, RC, is the same as the product of the equivalent series resistance and capacitance of the output capacitor. In some embodiments, the differential capacitor current sensing block includes a common voltage-to-current block, with a plurality of instantiations of current comparison blocks 447. The current comparison blocks provide, for example, indications of whether output capacitor current is above or below various levels, for example as discussed with respect to FIG. 3. In some embodiments signals indicative of fine or course adjustments are also used in incrementing or decrementing the counter of the control circuitry.

The control circuitry 425 may be implemented in a variety of ways, a particular example of which is provided in FIG. 4. In some embodiments the control circuitry increases a duty cycle of high side/low side switch operation when voltage feedback signal(s) indicate an undervoltage situation, decrease the duty cycle when the voltage feedback signal(s) indicate an overvoltage situation, and otherwise increase or decrease the duty cycle to minimize output capacitor current, based on indication(s) of output capacitor current. In some embodiments the control circuitry may also enter a PFM mode in light load conditions, or adjust switch operations for transient voltage droop or overshoot conditions. The example control circuitry of FIG. 4 includes an adder block 427, which receives the PTOL, NTOL, and fine/course adjustment signals. The adder block provides an increment/decrement signal to an integrator block 429. The integrator may be a counter, some other integrator, or PID block or some other control block. The increment/decrement signal, and its magnitude in some embodiments, is dependent on whether output voltage of the regulator is too high or too low, and whether output capacitor current indicates that fine or course adjustment, and its direction, is appropriate in view of output capacitor current. In some embodiments the output capacitor current indication signals are ignored if either the PTOL or NTOL signals are high, with the adder providing an increment or decrement signal, respectively, when those signal are high. In such embodiments, if the PTOL and NTOL signals are low, the counter may be incremented or decremented, to greater or lesser extents, based on the course and fine adjustment signals, respectively, for example as discussed with respect to FIG. 3.

The integrator block provides an N bit signal indicative of a resulting integration, which may be a count, to a digital-to-analog converter (DAC) 431. In some embodiments, and as illustrated in FIG. 4, the counter block also bases the N bit signal on whether a pulse frequency modulation block 449 indicates pulse frequency modulation should be performed, in which case pulse skipping may be performed based on the PTOL signal, for example. The DAC provides a voltage signal to a voltage-to-duty cycle converter block 433, which provides a PWM signal to a state machine and high side/low side switch driver block 435. The state machine and high side/low side switch driver block also receives an indication from the current feedback block as to whether hysteretic control of the regulator is desired. When hysteretic control of the regulator is desired, in some embodiments the state machine and high side/low side switch driver block may base control of the high side and low side switches on the hysteresis signals, instead of the signal provided by the voltage-to-duty cycle converter block.

Figure 5:
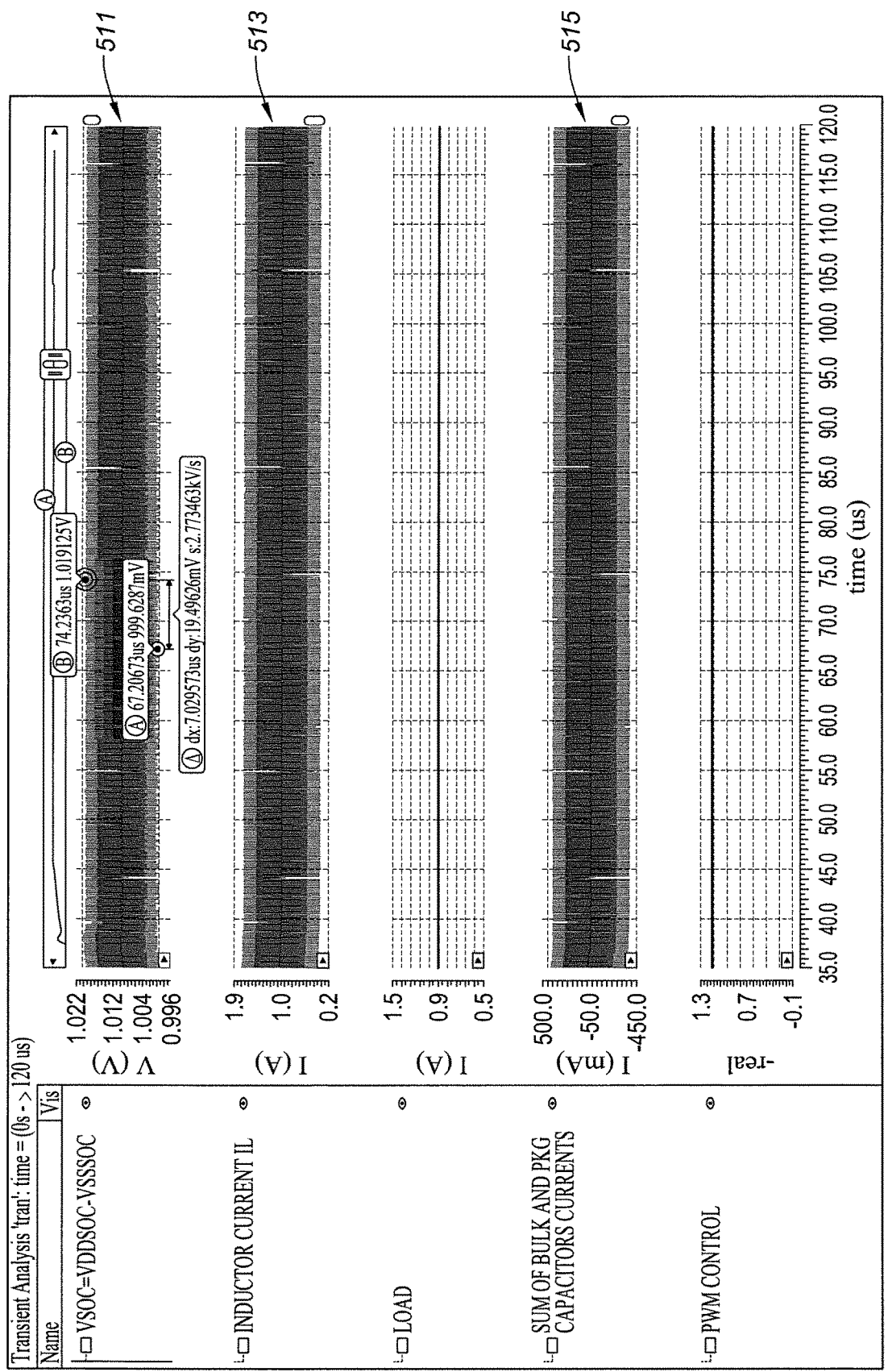
FIG. 5 provides graphs showing simulated steady state ripple for a voltage regulator in accordance with aspects of the invention.

FIG. 5 provides graphs showing simulated steady state ripple for a voltage regulator in accordance with aspects of the invention. The graphs indicate that for steady state load requirements output capacitor current may average to zero, with a duty cycle for the voltage regulator near an optimal value for minimal output voltage ripple.

Figure 6:
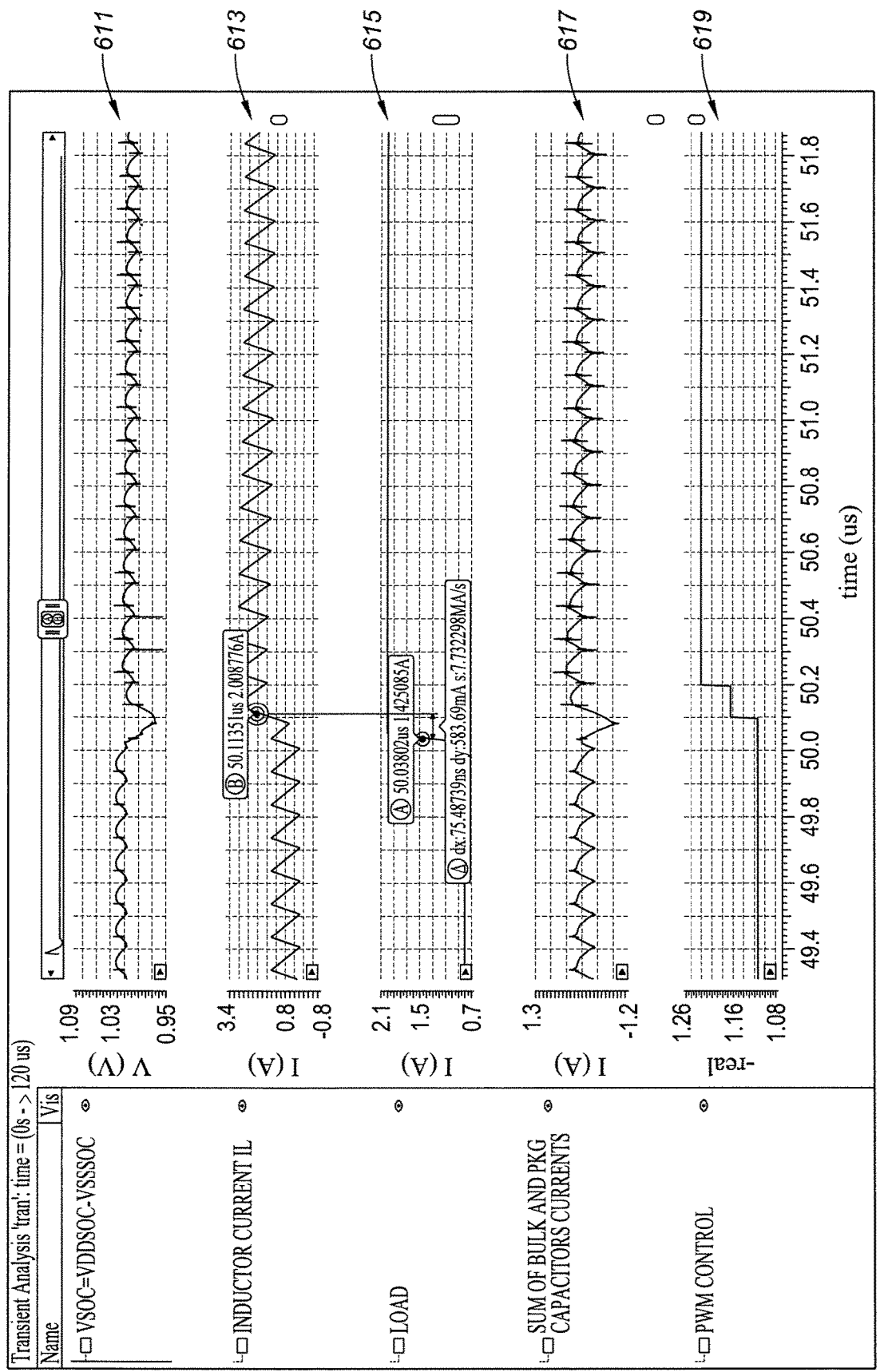
FIG. 6 provides graphs showing simulated transient step response delay for a voltage regulator in accordance with aspects of the invention.

FIG. 6 provides graphs showing simulated transient step response delay for a voltage regulator in accordance with aspects of the invention. For the graphs of FIG. 6, a load step occurs that results in output capacitor current going into a hysteretic control region. In the hysteretic control region the high side switch or the low side switch is turned on, with the high side switch being turned on in view of the positive load step for FIG. 6. However, the output capacitor current quickly returns closer to zero, into a fine control region.

Figure 7:
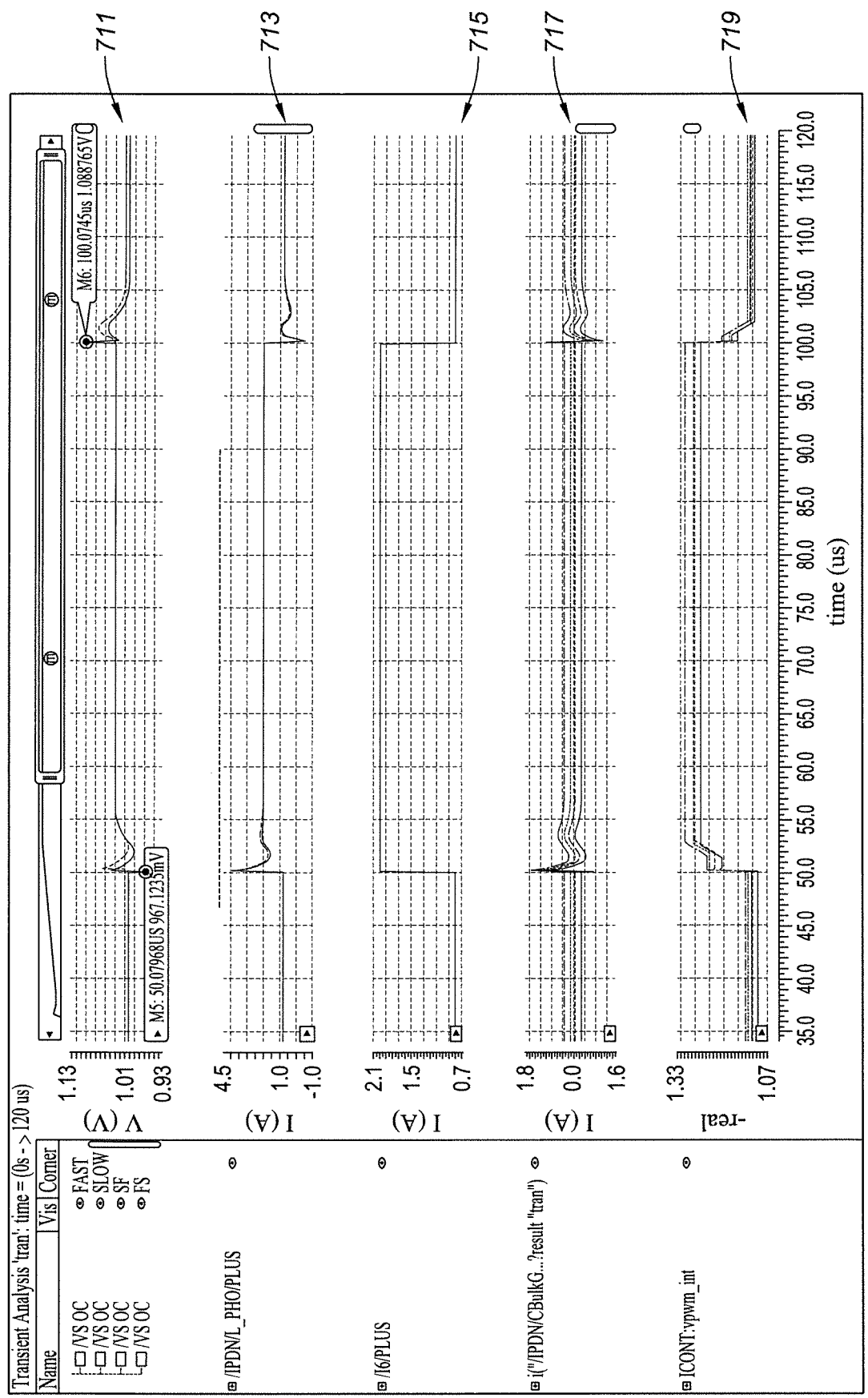
FIG. 7 provides graphs showing simulated operation for a voltage regulator at different process corners in accordance with aspects of the invention.

FIG. 7 provides graphs showing simulated operation for a voltage regulator at different process corners in accordance with aspects of the invention. As indicated in the graphs, an optimal duty cycle for the voltage regulator varies with temperature and process. However, sensing capacitor(s) and passive resistor(s) variation under the same conditions is generally less than that for active devices, allowing for decreased operating variability.

Figure 8:
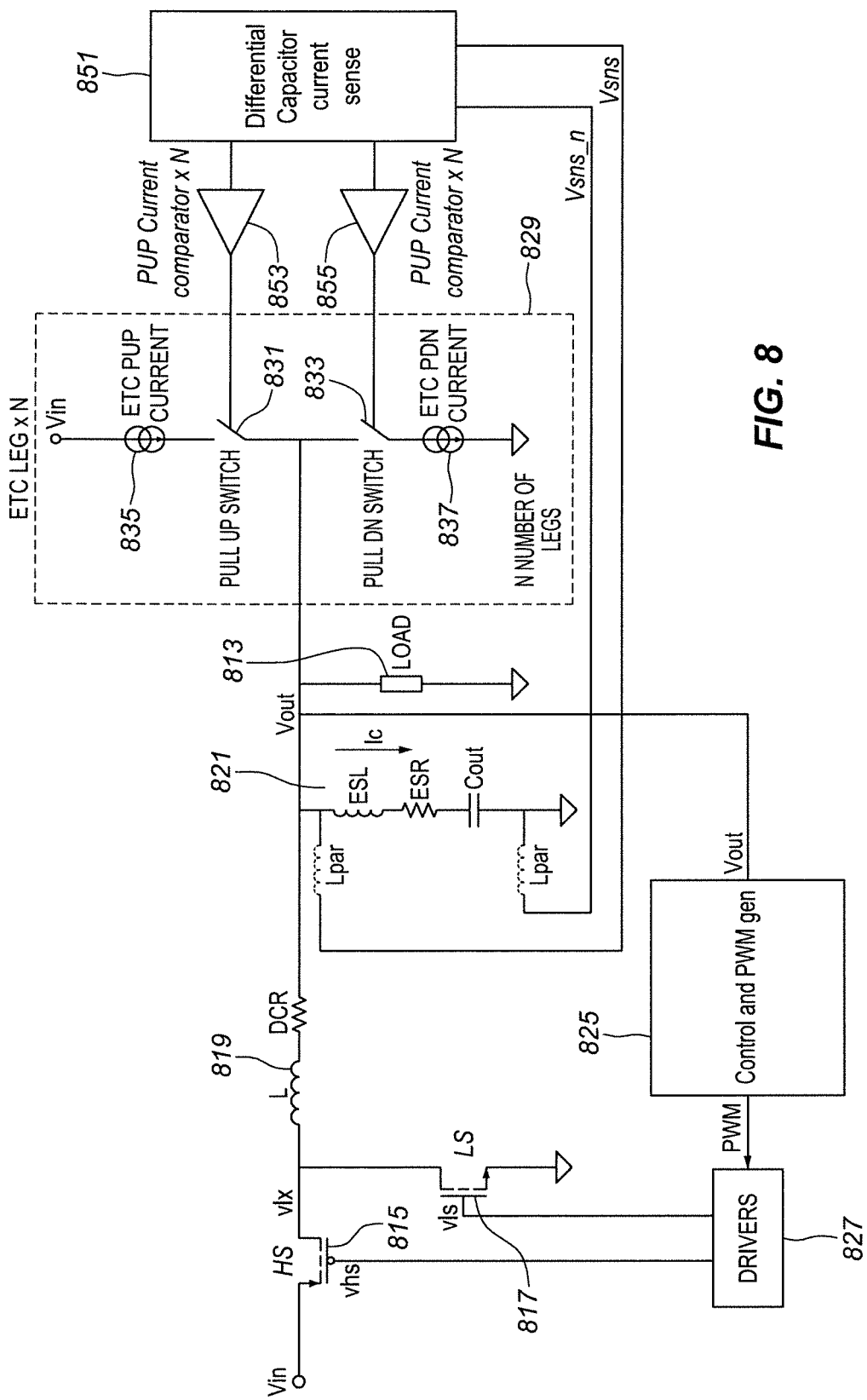
FIG. 8 is a semi-block diagram, semi-schematic including a switching voltage regulator utilizing a differential capacitor current sensing for activation of transient response circuitry in accordance with aspects of the invention.

FIG. 8 is a semi-block diagram, semi-schematic including a switching voltage regulator utilizing a differential capacitor current sensing for activation of transient response circuitry in accordance with aspects of the invention. The voltage regulator of FIG. 8, configured as a buck-type regulator, includes a high side switch 815 and a low side switch 417 coupled in series between an input voltage and a lower voltage. A first end of an inductor 819 is coupled to a node between the high side switch and the low side switch. A second end of the inductor is coupled to an output capacitor 821 in parallel to a load 813. The high side and low side switches are driven by drivers 827, as controlled by a Control and PWM generator block 825. The Control and PWM generator block determines switch operation based on output voltage feedback signals and output capacitor current signals, for example as discussed herein.

Signals indicative of output capacitor current may also be used in providing transient control functions. In FIG. 8, transient control circuitry 829 includes a plurality of legs, each including current provision circuitry 835 and current drain circuitry 837. The number of legs may vary from embodiment to embodiment, with FIG. 8 indicating provision of N legs. The current provision circuitry is shown as being able to provide current to the line coupling the output capacitor and the load when a pull up switch 831 is closed. The current drain circuitry is shown being able to drain current from the line coupling the output capacitor and the load when a pull down switch 833 is closed.

The pull up and pull down switches may be opened or closed based output capacitor current levels. In FIG. 8, a differential capacitor current sense block 851 determines an indication of current from the output capacitor, based on a differential signal provided by first and second signal lanes on opposing sides of the output capacitor. The indication of current from the output capacitor is compared to a plurality of current levels by, for example, N pull up current comparators 853 and N pull down current comparators 855. Results of the comparisons, depending on usage, may also be considered indications of capacitor current. In some embodiments the differential capacitor current sense block may be as discussed with respect to FIG. 2 or 4, and in some embodiments the differential capacitor current sense block may include the comparators. For ease of discussion, however, in FIG. 8 the comparators are shown separate from the differential capacitor current sense block, and the differential capacitor current sense block itself is shown separately off to one side of the figure (without showing outputs of the comparators coupled also to the control and PWM generator, as is the case in some embodiments), to allow for greater ease in understanding its use with the transient control circuitry. In some embodiments each of the N pull up current comparators may be used for activation of a corresponding one of the N pull up switches, and each of the N pull down current comparators may be used for activation of a corresponding one of the N pull down switches.

In some embodiments offsets used to determine output capacitor current levels, for example as discussed with respect to FIG. 2, may be dynamically changed during operation. For example, and considering the levels shown in FIG. 3, in some embodiments magnitudes of offsets may be increased each time output capacitor current enters the hysteresis region, or in some embodiments each predefined time period in which the output capacitor current is in the hysteresis region. In such embodiments, for example, a first leg of the transient control circuitry may be activated upon initial entry into the hysteresis region, with additional legs activated if the output capacitor current remains in the hysteresis region after increase in magnitudes of the offsets. Moreover, in some embodiments magnitudes of the offsets may be decreased as the output capacitor current exits the then set hysteresis region.

In some embodiments the legs of the transient control circuitry are configured to be able to supply an expected maximum load current to the load, Imax, for example so that output capacitor current may be zero or close to zero in the event of a very large load step. In such an embodiment each individual leg of N total legs may be able to provide current of Imax/N. In such embodiments, offsets used for different comparators may differ in magnitude based on a number legs of the transient control circuitry, a ratio of capacitance of the sensing capacitor and the output capacitor, and a gain of the BJTs used in the sensing circuitry. For example, in some embodiments the offset difference in magnitude may be equal to $\text{Imax}/N \times \text{Csns}/\text{Cout} \times (1-1/\beta)$, with N the number of legs, Csns the capacitance of the sensing capacitor, Cout the capacitance of the output capacitor, and $\beta$ the gain of the BJTs used in the sensing circuitry.

Figure 9:
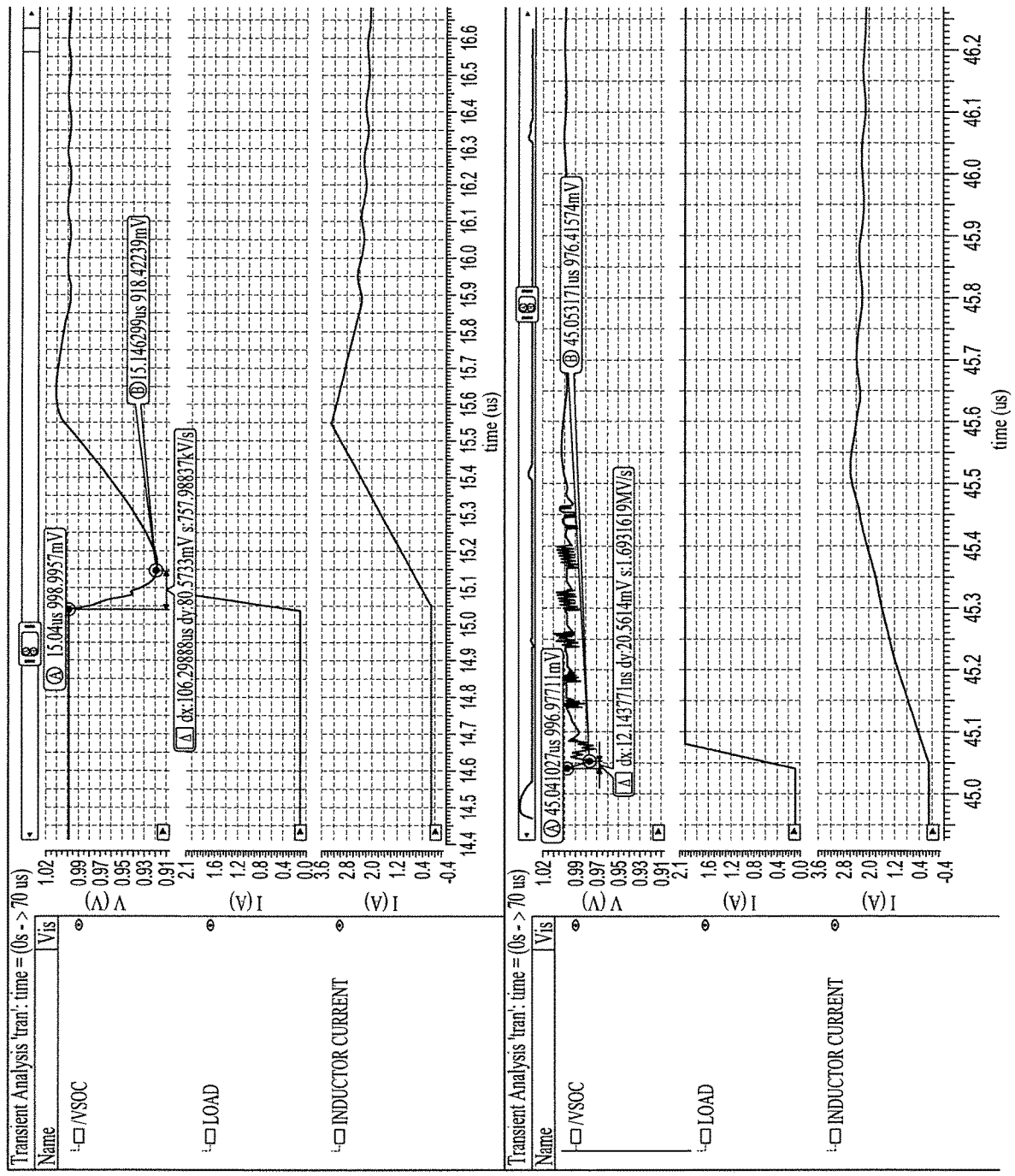
FIG. 9 provides graphs showing simulated transient response to a load step for a voltage regulator in accordance with aspects of the invention.

FIG. 9 provides graphs showing simulated transient response to a load step for a voltage regulator in accordance with aspects of the invention. An upper set of graphs illustrate a voltage regulator response to a transient load step, with the voltage regulator not including transient response circuitry operating based on indications of output capacitor current. A lower set of graphs illustrate a voltage regulator response to a transient load step, with the voltage regulator including transient response circuitry operating based on indications of output capacitor current. As indicated by the graphs, the magnitude of the voltage droop for the lower set of graphs is approximately only one third the magnitude of the voltage droop for the upper set of graphs.

Although the invention has been discussed with respect to various embodiments, it should be recognized that the invention comprises the novel and non-obvious claims supported by this disclosure.

What is claimed is:
1. A method of determining current of an output capacitor of a voltage regulator, comprising:

converting a first voltage across a first sensing capacitor, coupled to an output node of an output capacitor of the voltage regulator, to a first current;

converting a voltage across a ground sensing capacitor, coupled to a ground node of the output capacitor of the voltage regulator, to a ground current; and comparing the first current minus the current to a first particular current;

wherein the voltage regulator comprises a high side switch and a low side switch coupled in series between an input voltage and a lower voltage, an inductor with a first end coupled to a node between the high side switch and the low side switch and a second end coupled to the output capacitor, the output capacitor in parallel with a load.

2. The method of claim 1, wherein bipolar junction transistor current mirrors are used in the converting the first voltage across the first sensing capacitor to the first current and in the converting the voltage across the ground sensing capacitor to the ground current.

3. The method of claim 2, wherein a first resistance is in series with the first sensing capacitor, and a product of a resistance of the first resistance and a capacitance of the first sensing capacitor is equal to a product of a resistance of an equivalent series resistance of the output capacitor and a capacitance of the output capacitor.

4. The method of claim 1, wherein a first inverter is used to compare the first current minus the ground current to the first particular current.

5. The method of claim 4, wherein a first offset current source is provided to the first inverter, so as to provide the first particular current.

6. The method of claim 5, further comprising a plurality of further inverters, each coupled to a one of a plurality of further offset current sources, each of the plurality of further inverters comparing the first current minus the ground current to a one of a further plurality of particular currents.

7. Circuitry for determining current of an output capacitor of a voltage regulator, comprising:
at least one sensing capacitor coupled to an output node for an output capacitor of the voltage regulator;
at least one current mirror coupled to the sensing capacitor;
at least one ground sensing capacitor coupled to a ground node of the output capacitor;
at least one further current mirror coupled to the ground sensing capacitor; and
at least one current comparator for determining an indication of difference between current of the sensing capacitor and current of the ground sensing capacitor with respect to at least one offset current;
wherein the voltage regulator comprises a high side switch and a low side switch coupled in series between an input voltage and a lower voltage, an inductor with a first end coupled to a node between the high side switch and the low side switch and a second end coupled to the output capacitor, the output capacitor in parallel with a load.

8. The circuitry of claim 7, wherein the at least one current comparator comprises an inverter.

9. The circuitry of claim 7, wherein the at least one current comparator comprises a plurality of differential current comparator blocks, each of the plurality of differential current comparator blocks are coupled to the at least one further current mirror coupled to the output capacitor.

10. The circuitry of claim 9, wherein the plurality of differential current comparator blocks are configured to determine an indication of difference between current of the sensing capacitor and current of the ground sensing capacitor with respect to a plurality of offset currents.

11. The circuitry of claim 7, where the at least one current mirror and the at least one further current mirror comprise BJT current mirrors.

12. The circuitry of claim 11, further comprising at least one sense resistor coupled in series with the at least one sense capacitor.

13. The circuitry of claim 12, where a product of resistance of the at least one sense resistor and capacitance of the at least one sense capacitor is equal to a product of capacitance of the output capacitor and resistance of an equivalent series resistance of the output capacitor.

14. A method of using output capacitor current information in controlling a voltage regulator, comprising:
comparing output capacitor current to a plurality of predetermined current levels, the predetermined current levels defining a plurality of different regions of current levels;
operating switches of the voltage regulator based on at least one output voltage feedback signal, and without regard to output capacitor current, when the output capacitor current is in a first region, the first region including an output capacitor current equal to zero;
adjusting duty cycles of operation of the switches by a first extent when the output capacitor current is in a second or third region, the second and third region each bounding the first region, on opposite sides; and
adjusting duty cycles of operation of the switches by a second extent, the second extent having a magnitude greater than the first extent, when the output capacitor current is in a fourth or fifth region, the fourth region bounding the second region and the fifth region bounding the third region.

15. The method of claim 14, further comprising:
determining that the output capacitor current is in a sixth region or a seventh region, the sixth region bounding the fourth region and the seventh region bounding the fifth region; and In response to determining that the output capacitor current is in the sixth region or seventh region, activating transient control circuitry configured to either provide current to a line coupling the output capacitor to a load or drain current from the line coupling the output capacitor to the load.

16. A method of controlling operation of transient response circuitry for a voltage regulator, comprising:
determining that an absolute magnitude of output capacitor current exceeds a predetermined limit; and
in response to determining that an absolute magnitude of output capacitor current exceeds a predetermined limit, activating transient control circuitry configured to either provide current to a line coupling the output capacitor to a load or drain current from the line coupling the output capacitor to the load.

17. The method of claim 16, further comprising increasing the predetermined limit each time the absolute magnitude of output capacitor current exceeds the predetermined limit.

* * * * *

UNITED STATES PATENT AND TRADEMARK OFFICE
CERTIFICATE OF CORRECTION

PATENT NO. : 10,840,803 B2
APPLICATION NO. : 16/546111
DATED : November 17, 2020
INVENTOR(S) : Arnaud Toni and Mykhaylo Teplechuk Page 1 of 1

It is certified that error appears in the above-identified patent and that said Letters Patent is hereby corrected as shown below:

On the Title Page

Item (73), Column 1 (Assignee), Line 1, delete "Jiangyian" and insert --Jiangyin--, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*